(12) United States Patent
Blincow

(10) Patent No.: US 10,526,095 B2
(45) Date of Patent: Jan. 7, 2020

(54) GATEWAY SEGMENT ASSEMBLY LINE

(71) Applicant: John Jeffrey Blincow, Alta Loma, CA (US)

(72) Inventor: John Jeffrey Blincow, Alta Loma, CA (US)

( * ) Notice: Subject to any disclaimer, the term of this patent is extended or adjusted under 35 U.S.C. 154(b) by 498 days.

(21) Appl. No.: 14/986,262

(22) Filed: Dec. 31, 2015

(65) Prior Publication Data
US 2016/0185472 A1 Jun. 30, 2016

Related U.S. Application Data

(60) Provisional application No. 62/098,376, filed on Dec. 31, 2014.

(51) Int. Cl.

| | | |
|---|---|---|
| *B64G 1/10* | (2006.01) | |
| *B64G 4/00* | (2006.01) | |
| *B64G 99/00* | (2009.01) | |
| *B64G 1/64* | (2006.01) | |
| *B23P 21/00* | (2006.01) | |
| *B64G 1/44* | (2006.01) | |

(52) U.S. Cl.
CPC .......... *B64G 1/1078* (2013.01); *B23P 21/004* (2013.01); *B64G 1/646* (2013.01); *B64G 4/00* (2013.01); *B64G 9/00* (2013.01); *B64G 1/44* (2013.01); *B64G 2004/005* (2013.01)

(58) Field of Classification Search
CPC ............. B23P 21/004; Y10T 29/49829; Y10T 29/534; Y10T 29/53539–53548; Y10T 29/49622; Y10T 29/49623; B64G 1/1078; B64G 1/44–443; B64G 1/646; B64G 4/00–2004/005; B64G 9/00
See application file for complete search history.

(56) References Cited

U.S. PATENT DOCUMENTS 4,730,797 A * 3/1988 Minovitch ............... B64G 9/00
244/158.3
4,885,836 A * 12/1989 Bonomi ................... B21J 15/10
227/51

(Continued)

OTHER PUBLICATIONS

Feast et al.; A Design for an Orbital Assembly Facility for Complex Missions; presented Oct. 1, 2008; IAC-08.D3.3.1.*

*Primary Examiner* — Matthew P Travers

(57) ABSTRACT

A gateway segment assembly line that allows for the construction of space stations while in orbit by fabricating individual segments in space. An assembly housing provides an open ended structure through which materials are processed in order to construct a segment for a space station. The materials are loaded into a plurality of workstations positioned along the assembly housing through the use of a plurality of external manipulators adjacently connected to the assembly housing. Each of the plurality of workstations provides the equipment for sequentially loading materials into the assembly housing. An assembly line conveyor, positioned throughout the plurality of workstations, guides materials through the assembly housing as the materials are mated to form the segment. Upon completion of the segment, a plurality of segment transport units transports the segment to an orbital construction site, wherein the segment is mated with subsequent segments to form the space station.

12 Claims, 10 Drawing Sheets

(56) References Cited

U.S. PATENT DOCUMENTS

| | | | | | |
|---|---|---|---|---|---|
| 6,378,810 | B1* | 4/2002 | Pham | ................ | B64G 1/10 |
| | | | | | 244/158.5 |
| 8,894,017 | B1* | 11/2014 | Baghdasarian | ........ | B64G 1/443 |
| | | | | | 136/245 |
| 2004/0093731 | A1* | 5/2004 | Sarh | ................ | B21J 15/10 |
| | | | | | 29/897.3 |
| 2005/0178921 | A1* | 8/2005 | Stribling | ................ | B64G 1/222 |
| | | | | | 244/172.7 |
| 2007/0023579 | A1* | 2/2007 | Wang | ................ | B64G 1/281 |
| | | | | | 244/158.6 |
| 2007/0034247 | A1* | 2/2007 | Takada | ................ | B64G 1/443 |
| | | | | | 136/244 |
| 2008/0135686 | A1* | 6/2008 | Wang | ................ | B64G 1/363 |
| | | | | | 244/171 |
| 2009/0132102 | A1* | 5/2009 | Guyot | ................ | B64G 1/24 |
| | | | | | 701/3 |
| 2010/0289342 | A1* | 11/2010 | Maness | ................ | B64G 1/007 |
| | | | | | 307/104 |
| 2012/0205492 | A1* | 8/2012 | Gelon | ................ | B64G 1/1007 |
| | | | | | 244/171.8 |
| 2012/0303185 | A1* | 11/2012 | Munir | ................ | G05D 1/0883 |
| | | | | | 701/13 |
| 2015/0266147 | A1* | 9/2015 | Reid | ................ | B23P 21/004 |
| | | | | | 29/525.01 |
| 2017/0183109 | A1* | 6/2017 | Aylmer | ................ | B64G 1/646 |

* cited by examiner

GATEWAY SEGMENT ASSEMBLY LINE

The current application claims a priority to the U.S. Provisional Patent application Ser. No. 62/098,376 filed on Dec. 31, 2014.

FIELD OF THE INVENTION

The present invention relates generally to a system and method for constructing large structures in space, such as space stations, telescopes, power stations, and large antennas. More specifically, the present invention is an autonomous system that constructs interlocking segments of a space station.

BACKGROUND OF THE INVENTION

Current methods for the construction of structures in space, such as the International Space Station (ISS), is quite cumbersome and inefficient. Modules are pre-fabricated on Earth and then launched into space where said modules are mated with one another to form the overall larger structure that is the ISS. The fabricated modules are large and do not maximize the cargo space that is utilized when launching the modules into space. Resultantly, more launches are required in order to transport all of the necessary modules and components into space in order to form the space station. More launches equates to more money and a longer time interval for the completion of construction of the space station as launches require vast amounts of preparation. A more efficient method for the construction of a space station would be to transport materials to space, wherein the materials would then be used to fabricate the modules in orbit. This would allow for the more efficient transport of material, thus requiring less money and time.

Therefore, it is the object of the present invention to provide an automated assembly line deployed in space that is designed to construct sections or segments of a larger structure in orbit. The present invention is a gateway segment assembly line (GSAL); a long box shaped assembly line that creates space station segments by welding or attaching: floor sheets, wall sheets, beams, and other major structural members or large components in one continuous sequence. The GSAL is an open ended structure that is not intended to be pressurized or manned. Materials for constructing each segment will be loaded directly from a transport spacecraft into the GSAL by use of a plurality of external manipulators mounted on an assembly housing that forms the assembly line structure. Loading mechanisms will feed segment beams into "beam guides" and floor and wall panels onto powered rollers that move the segment beams and panels into place for welding. In one embodiment, the GSAL beam guides are mounted on electric jackscrews to allow the beam guides to be repositioned in order to construct both square and wedge shaped segments. By connecting wedge shaped segments together, ringed sections of a space station can be produced that can be used to create artificial gravity under spin. Each segment may be different in terms of fabrication and the additional components that may be installed such as interior walls, electrical conduits, air ducts, etc. Codes for every segment configuration will be up-loaded to the GSAL just before each transport spacecraft arrives. Materials for constructing each segment are loaded onto the transport spacecraft in proper sequence to coincide with the given segment configuration and the order of fabrication through the GSAL.

DETAIL DESCRIPTIONS OF THE INVENTION

Figure 1:
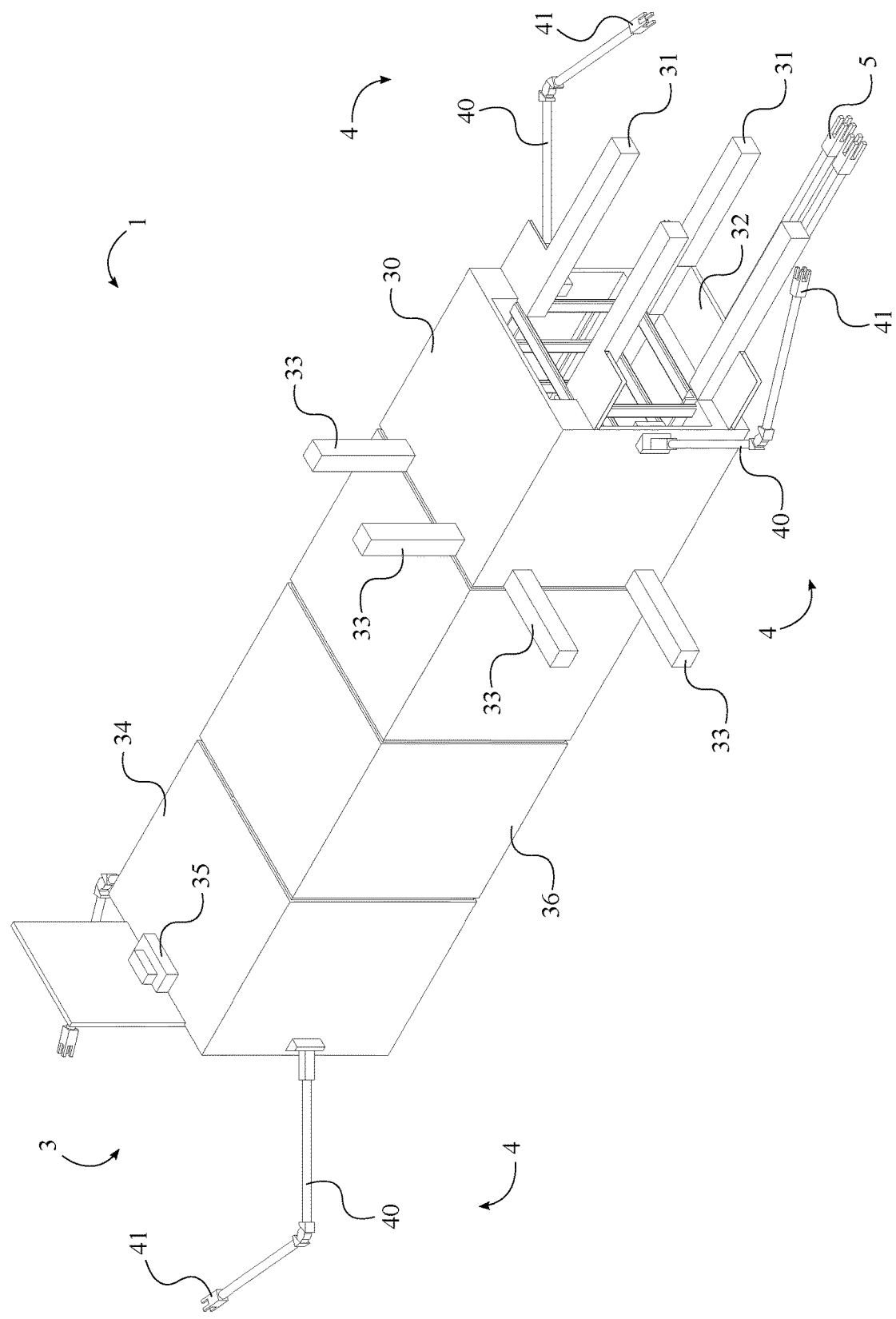
FIG. 1 is a perspective view of the assembly housing, wherein the plurality of workstations is linearly positioned along the assembly housing.

All illustrations of the drawings are for the purpose of describing selected versions of the present invention and are not intended to limit the scope of the present invention.

The present invention is a gateway segment assembly line (GSAL) that allows for the construction of space stations and other structures while in orbit. The GSAL is designed to be an unmanned system that receives materials from a transport spacecraft and manufacturing instructions from a remotely situated base station. Using the provided materials and the manufacturing instructions, the GSAL constructs a segment; the segment being a single section of a more complex and larger space station or structure. Upon construction of the segment by the GSAL, the segment is guided to an orbital construction site where the segment is merged with previously constructed segments. The GSAL then continues to produce segments as instructed in order to complete the construction of the structure.

The present invention comprises an assembly housing 1, an assembly line conveyor 2, a plurality of workstations 3, a plurality of external manipulators 4, a spacecraft docking mechanism 5, a power source 6, and a plurality of segment transport units 7. In reference to FIG. 1-3, the assembly housing 1 provides an open ended structure into which the materials are inserted and the segment formed from said materials is expelled. The plurality of workstations 3 is sequentially positioned along the assembly housing 1, wherein each of the plurality of workstations 3 provides the components needed for the orderly fabrication of the segment. More specifically, the plurality of workstations 3 is linearly positioned along the assembly housing 1, wherein materials are directed straight through the assembly housing 1. The plurality of workstations 3 comprises a loading station 30, an at least one specialized fabrication station 36, and a castoff station 34; the loading station 30 and the castoff station 34 being positioned opposite each other along the assembly housing 1, wherein the flow of materials is directed from the loading station 30 to the castoff station 34.

In reference to FIG. 1, the spacecraft docking mechanism 5 provides a means for securely connecting the transport spacecraft to the assembly housing 1, such that the materials can be safely unloaded from the transport spacecraft and loaded into the assembly housing 1. As such, the spacecraft docking mechanism 5 is adjacently connected to the assembly housing 1 and is positioned adjacent to the loading station 30, opposite the castoff station 34. The spacecraft docking mechanism 5 can provide a single point of contact or multiple points of contact between the assembly housing 1 and the transport station depending on the size of the transport spacecraft and the stabilization needs.

Once the transport spacecraft is engaged with the spacecraft docking mechanism 5, the plurality of external manipulators 4 is used to the unload the materials from the transport spacecraft into the assembly housing 1. Different materials are distributed to each of the plurality of workstations 3 according to the sequential assembly of the segment within the GSAL, as directed by the manufacturing instructions. The loading station 30 receives the materials for forming the shell or base structure of the segment and comprises a plurality of beam loaders 31 and a at least one plate loader 32 that are adjacently connected to the assembly housing 1. Each of the plurality of beam loaders 31 receives longitudinal beams that provide support along the length of the segment, while each of the at least one plate loader 32 receives panels for forming the floor, walls, and ceiling that are supported by the longitudinal beams.

Figure 2:
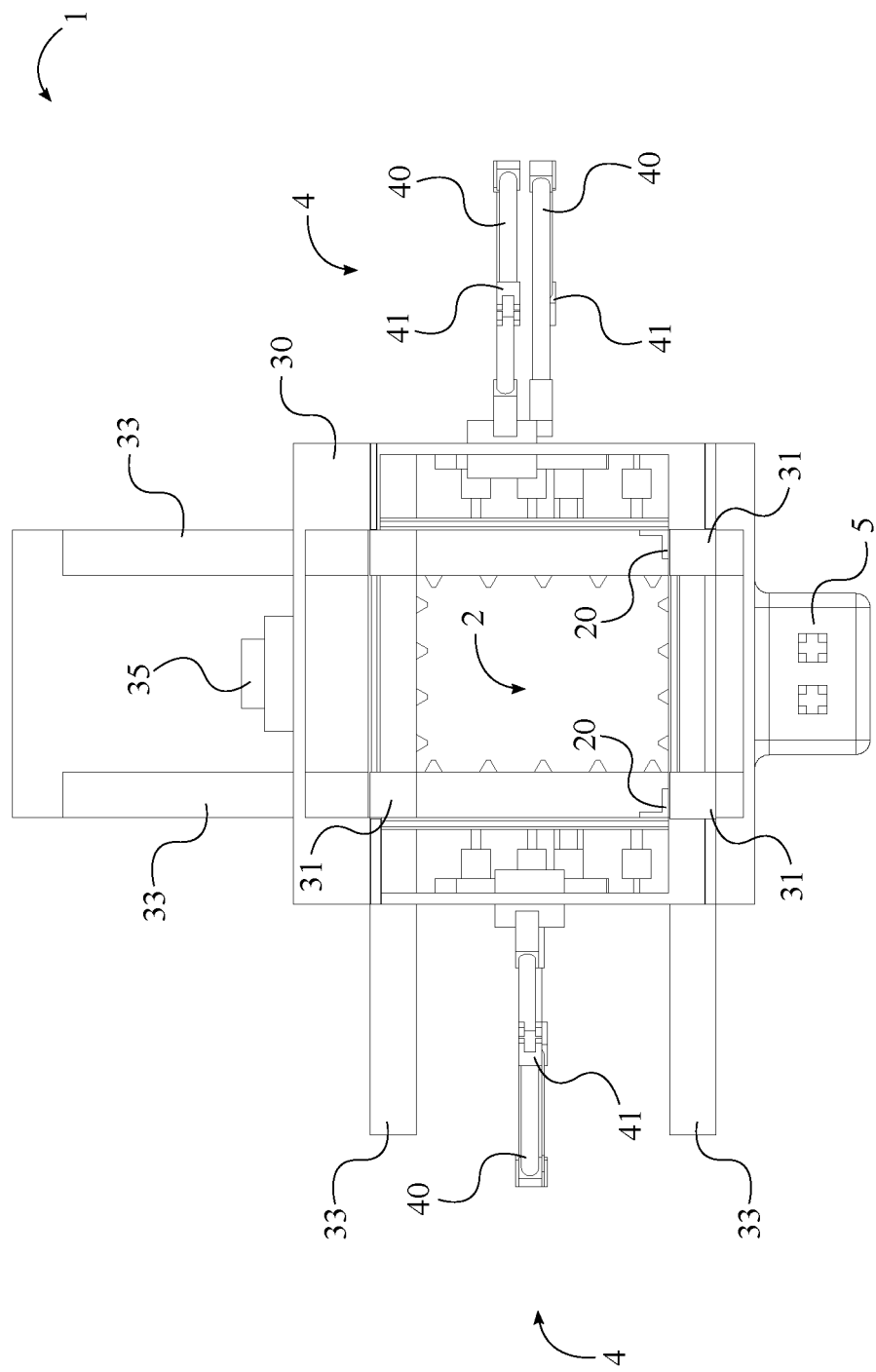
FIG. 2 is a front view of the assembly housing, showing the loading station and the plurality of beam loaders and the plurality of support beam loaders traversing through the assembly housing.
Figure 3:
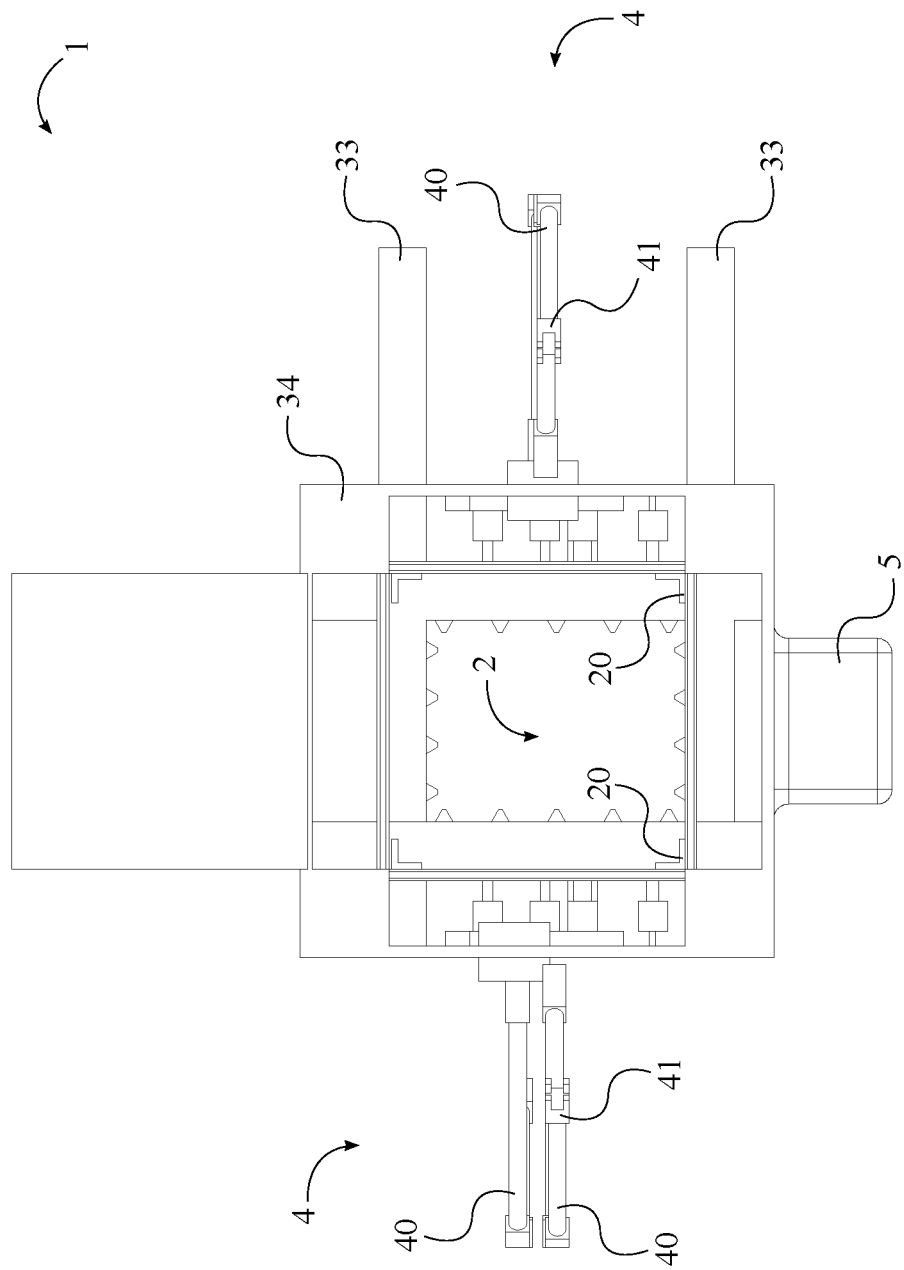
FIG. 3 is a rear view of the assembly housing, showing the castoff station.

In reference to FIG. 1-2, the plurality of beam loaders 31 and the at least one plate loader 32 are perimetrically positioned around the assembly housing 1 opening, wherein the plurality of beam loaders 31 and the at least one plate loader 32 are aligned with the assembly line conveyor 2. The assembly line conveyor 2 is positioned within and connected to the assembly housing 1, wherein the assembly line conveyor 2 is positioned along the plurality of workstations 3. Each of the plurality of beam loaders 31 sequentially positions the longitudinal beams onto the assembly line conveyor 2, while the each of the at least one plate loader 32 sequentially positions the panels onto the assembly line conveyor 2. The assembly line conveyor 2 then directs the longitudinal beams and the panels throughout the assembly housing 1 where the remainder of the fabrication occurs.

Figure 4:
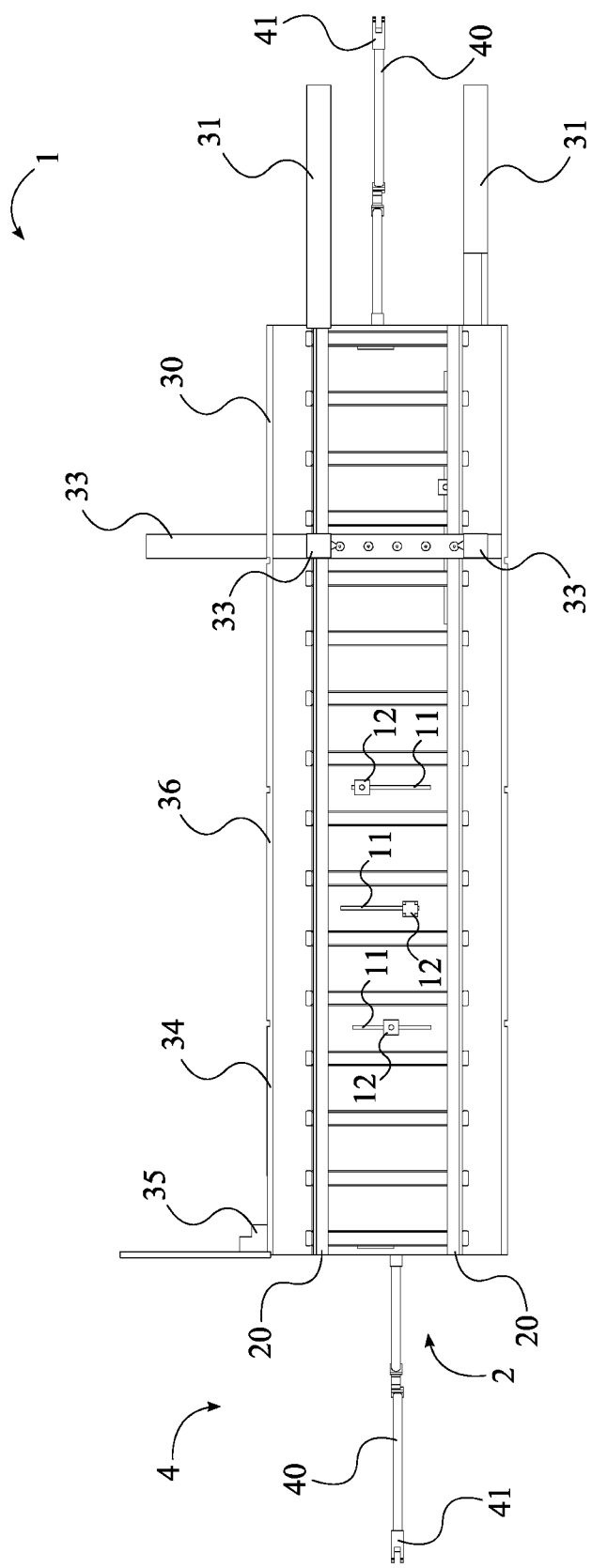
FIG. 4 is a left side sectional view showing the assembly line conveyor traversing along the assembly housing, through the plurality of workstations.

In reference to FIG. 4, the assembly line conveyor 2 controls the flow of production by regulating the movement of materials through the assembly housing 1, and thus, the timing of each construction operation throughout the plurality of workstations 3. The assembly line conveyor 2 can be any type of mechanism that allows for the regulated movement of materials through the assembly housing 1. An exemplar embodiment of the assembly line conveyor 2 makes use of a plurality of rollers distributed across the internal walls of the assembly housing 1, wherein the plurality of rollers guides segment components from the loading station 30 to the castoff station 34. Additional embodiments of the assembly line conveyor 2 include, but are not limited to, conveyor belts, magnetic levitation tracks, pulley systems, or other assembly line techniques appropriate for moving components in a gravity free environment.

The plurality of beam loaders 31 and the at least one plate loader 32 are repositionable about the perimeter of the loading station 30, such that differently shaped segments can be formed. In reference to FIG. 2, the plurality of beam loaders 31 is positioned about the four corners of the opening to the assembly housing 1, wherein the segment is formed having a rectangular cross section. In order to change the cross section of the segment, each of the plurality of beam loaders 31 can be rotated about the perimeter of the assembly housing 1 or pivoted in place. The at least one plate loader 32 is then repositioned in correspondence with the plurality of beam loaders 31, such that the panels are appropriately loaded along with the longitudinal beams. The plurality of beam loaders 31 and the at least one plate loader 32 can be repositioned using motorized jackscrews, a track system, or any other suitable means for changing the alignment of the plurality of beam loaders 31 and the at least one plate loader 32.

In reference to FIG. 4, the assembly line conveyor 2 comprises a plurality of beam guides 20 that directs the longitudinal beams through the assembly housing 1. Each of the plurality of beam guides is a structure that supports the longitudinal beams on one or more slides, and directs the longitudinal beams linearly throughout the assembly housing 1. The plurality of beam guides 20 is aligned with the plurality of beam loaders 31, such that the longitudinal beams are loaded from the plurality of beam loaders 31 directly onto the plurality of beam guides 20. The plurality of beam guides 20 is also repositionable with the plurality of beam loaders 31 in order to form differently shaped segments. Similar to the plurality of beam loaders 31, the plurality of beam guides 20 can be repositioned using electric jackscrews, or any other suitable mechanism.

In reference to FIG. 1-2, the loading station 30 further comprises a plurality of support beam loaders 33 for mating wall studs and cross beams with the longitudinal beams. The plurality of support beam loaders 33 is positioned opposite the plurality of beam loaders 31 and the at least one plate loader 32, wherein the plurality of support beam loaders 33 is positioned in between the plurality of beam loaders 31 and the castoff station 34. Each of the plurality of support beam loaders 33 receives either wall studs or cross beams that are sequentially loaded into the assembly housing 1 to be mated with the longitudinal beams and the panels. The assembly line conveyor 2 directs the longitudinal beams and the panels through the loading station 30 to the plurality of support beam loaders 33, where the wall studs and cross beams are then positioned in relation to the longitudinal beams by the plurality of support beam loaders 33.

Each of the plurality of support beam loaders 33 is adjacently connected to the assembly housing 1 and traverses through the assembly housing 1, wherein each of the plurality of support beam loaders 33 provides an entry into the assembly housing 1. The wall studs and cross beams are first loaded into the plurality of support beam loaders 33 by the plurality of external manipulators 4. The plurality of support beam loaders 33 then sequentially inserts the wall studs and cross beams into the assembly housing 1 to be mated with the longitudinal beams and form a frame structure. Similar to the plurality of beam loaders 31 and the at least one plate loader 32, each of the plurality of support beam loaders 33 is repositionable about the perimeter of the assembly housing 1. This allows each of the plurality of support beam loaders 33 to be moved in correspondence with the plurality of beam loaders 31 and the at least one plate loader 32 in order to form differently shaped segments.

The assembly line conveyor 2 directs the frame structure from the loading station 30 to the at least one specialized fabrication station 36; the at least one specialized fabrication station 36 being positioned in between the loading station 30 and the castoff station 34. Each of the at least one specialized fabrication station 36 is designed and equipped to outfit the segment with a particular set of materials. For example, the at least one specialized fabrication station 36 can be designed to install electrical conduits, air ducts, etc. Similar to the loading station 30, materials are supplied to each of the at least one specialized fabrication station 36 through the plurality of external manipulators 4. Additive manufacturing mechanisms can also be fitted to fabricate items for installment.

Figure 5:
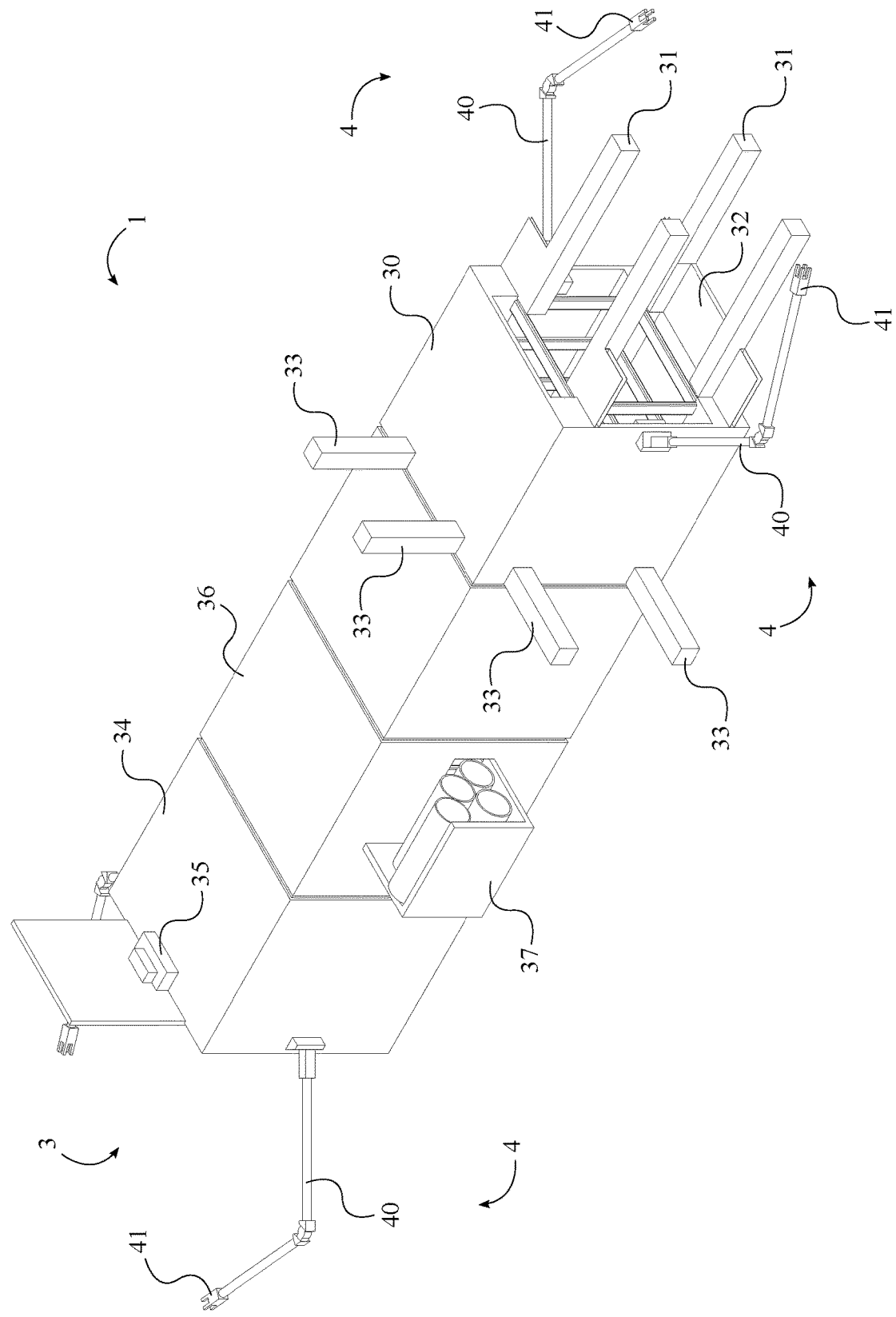
FIG. 5 is a perspective view showing the at least one material loader of the at least one specialized fabrication station.

In reference to FIG. 5, each of the at least one specialized fabrication station 36 comprises an at least one material loader 37 that is used to direct materials through the assembly housing 1. As such, each of the at least one material loader 37 is adjacently connected to the assembly housing 1 and traverses through the assembly housing 1. The materials, such as electrical conduits or air ducts, are first loaded into the at least one material loader 37 by the plurality of external manipulators 4. The at least one material loader 37 then sequentially inserts the materials into the assembly housing 1 to be appropriately positioned within the frame structure as dictated by the manufacturing instructions. Each of the at least one material loader 37 may also be repositionable about the perimeter of the assembly housing 1 in order to account for the various types of segments that may be constructed.

Once the materials, such as electrical conduits and air ducts, are added to the frame structure, the assembly line conveyor 2 directs the segment to the castoff station 34. The castoff station 34 makes the final addition of end panels and cross sectional walls to the segment, and as such comprises a wall loader 35. Cross sectional wall panels are loaded into the wall loader 35 by the plurality of external manipulators 4, wherein the wall loader 35 then places the cross sectional wall panels into position along the segment as the segment is expelled from the assembly housing 1. The wall loader 35 is positioned opposite the at least one specialized fabrication station 36, about the open end of the assembly housing 1, allowing the cross sectional wall panels to be readily pushed into place by the wall loader 35.

In reference to FIG. 4, the assembly housing 1 comprises an assembler guide network 11 and a plurality of robotic assemblers 12 that are provided to properly mate all of the materials to each other as said materials are guided through the assembly housing 1. The assembler guide network 11 is positioned adjacent to the assembly line conveyor 2, throughout the plurality of workstations 3, and provides a series of mounts for the plurality of robotic assemblers 12. Each of the plurality of robotic assemblers 12 is slidably connected to the assembler guide network 11, wherein each of the plurality of robotic assemblers 12 can traverse in two dimensions about the inner surfaces of the assembly housing 1. The plurality of robotic assemblers 12 provides the means for mating and installing the materials within the assembly housing 1. As such, each of the plurality of robotic assemblers 12 provides a means for welding, bolting, clamping, gluing, screwing, riveting, or otherwise affixing said materials to one another. For example, each of the plurality of robotic assemblers 12 could be equipped with a friction stir welder or arc welding tools for joining the seams between materials used to form the segment.

The plurality of external manipulators 4 allows the present invention to unload the materials from the transport spacecraft and distribute the materials about the assembly housing 1. In reference to FIG. 1, each of the plurality of external manipulators 4 is adjacently connected to the assembly housing 1 opposite the assembly line conveyor 2, wherein the each of plurality of external manipulators 4 is able to maneuver materials outside of the assembly housing 1. In addition to providing a means for maneuvering materials outside of the assembly housing 1, the plurality of external manipulators 4 may also provide an additional means for mating the materials.

Figure 6:
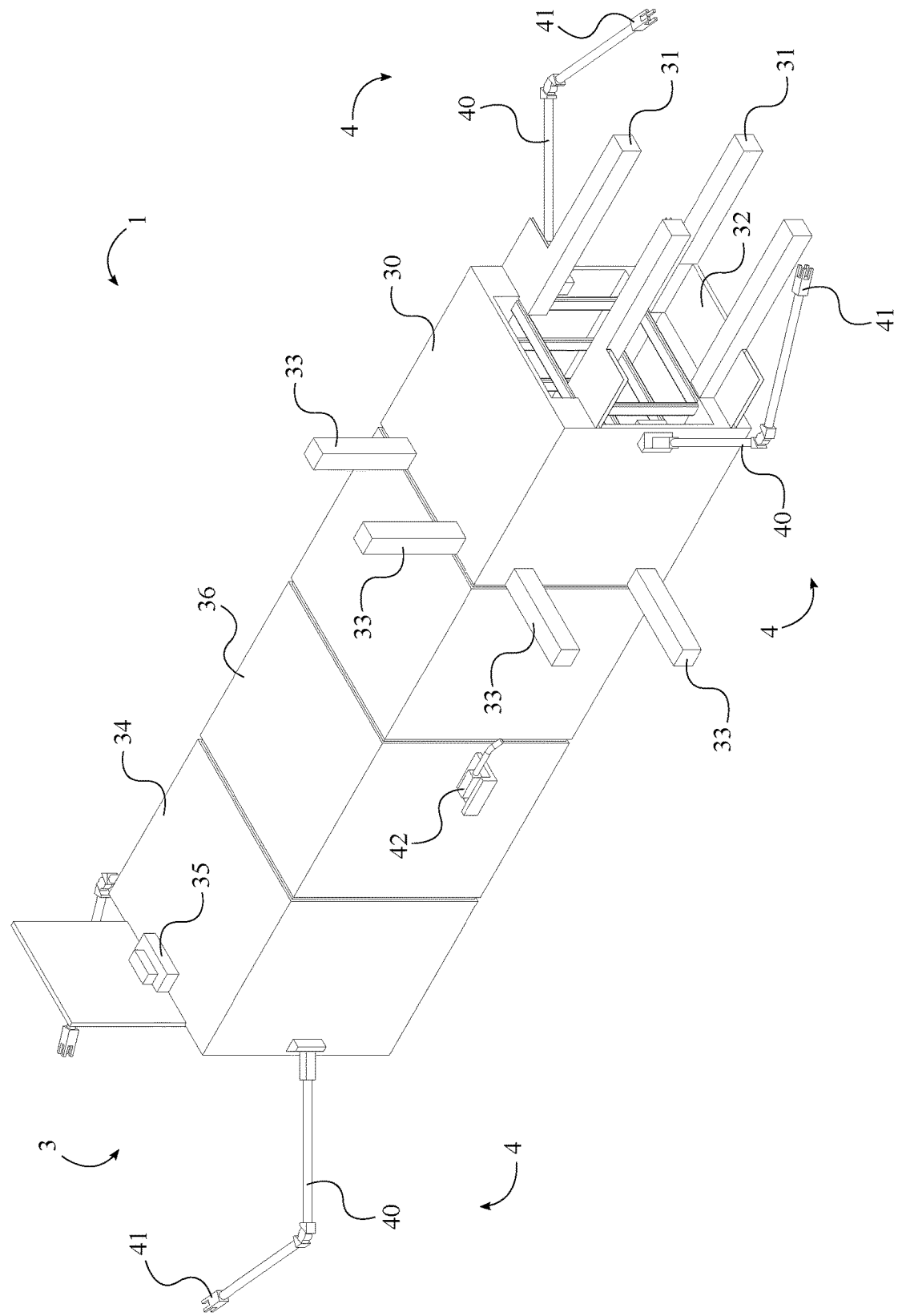
FIG. 6 is a perspective view showing the second manipulator extremity being attached to the assembly housing.

In reference to FIG. 6, to provide a means for both grasping materials and mating materials, each of the plurality of external manipulators 4 comprises a maneuverable arm 40, a first manipulator extremity 41, and a second manipulator extremity 42. The maneuverable arm 40 is a multi-jointed appendage adjacently connected to the assembly housing 1 that allows for three dimensional movement about the assembly housing 1. The first manipulator extremity 41 is terminally attached to the maneuverable arm 40 opposite the assembly housing 1 and provides a means for securely grasping materials in order to maneuver said materials about the assembly housing 1. The first manipulator extremity 41 may utilize mechanical mechanisms, electromagnetic mechanisms, or any other mechanisms suitable for securely grasping and maneuvering an object in a gravity free environment.

The second manipulator extremity 42 provides a means for mating materials (e.g. welding, bolting, riveting) and is adjacently attached to the assembly housing 1, wherein the second manipulator extremity 42 is interchangeable with the first manipulator extremity 41. To interchange the first manipulator extremity 41 and the second manipulator extremity 42, the maneuverable arm 40 directs the first manipulator extremity 41 to a dock, or attachment mechanism, wherein the first manipulator extremity 41 is attached to the assembly housing 1. The maneuverable arm 40 is then disengaged from the first manipulator extremity 41 and positioned to engage with the second manipulator extremity 42. The second manipulator extremity 42 is then attached to the maneuverable arm 40 and detached from the assembly housing 1, wherein the maneuverable arm 40 can freely control the second manipulator extremity 42.

Figure 7:
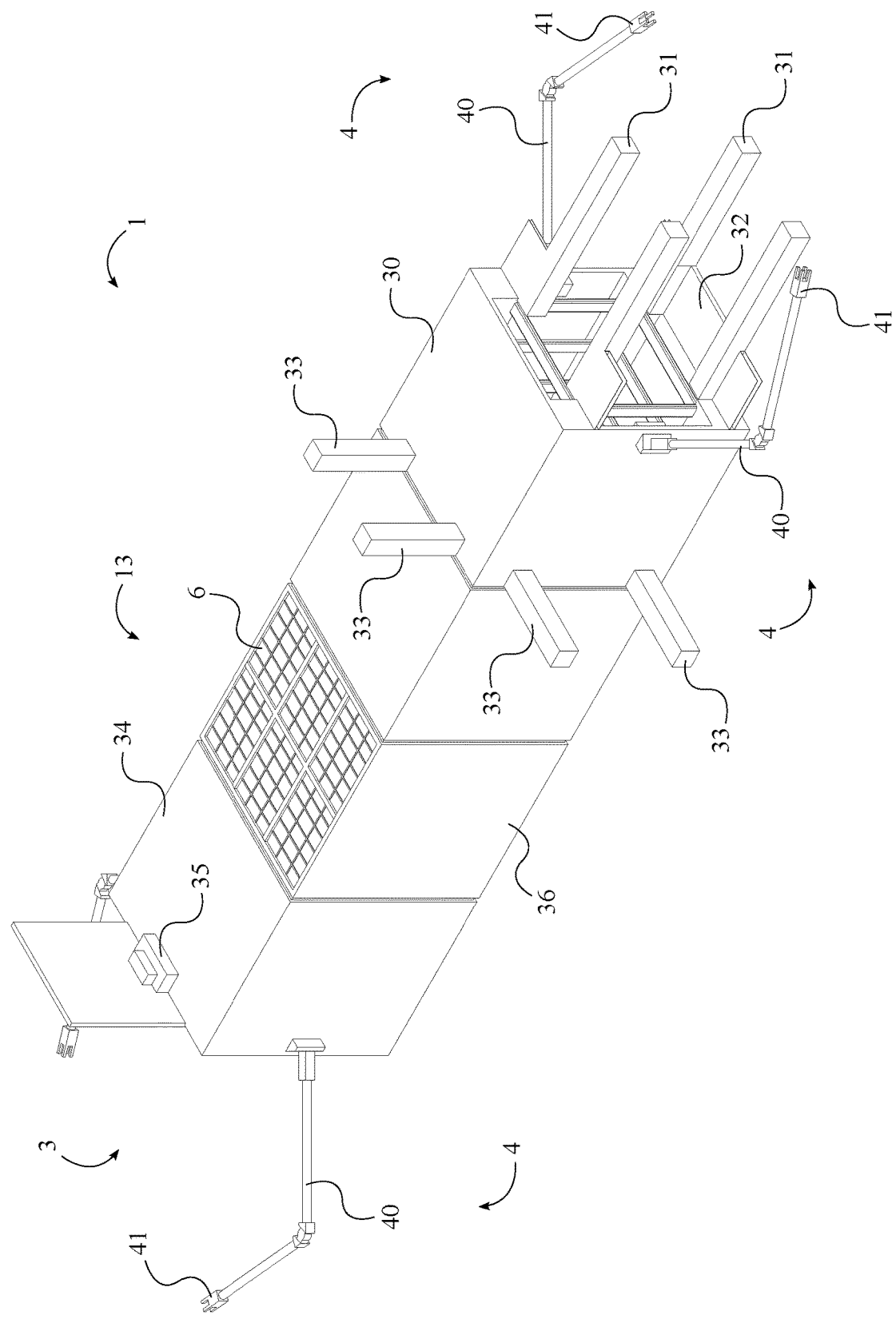
FIG. 7 is a perspective view of the power source being a solar array integrated into the outer surface of the assembly housing.
Figure 8:
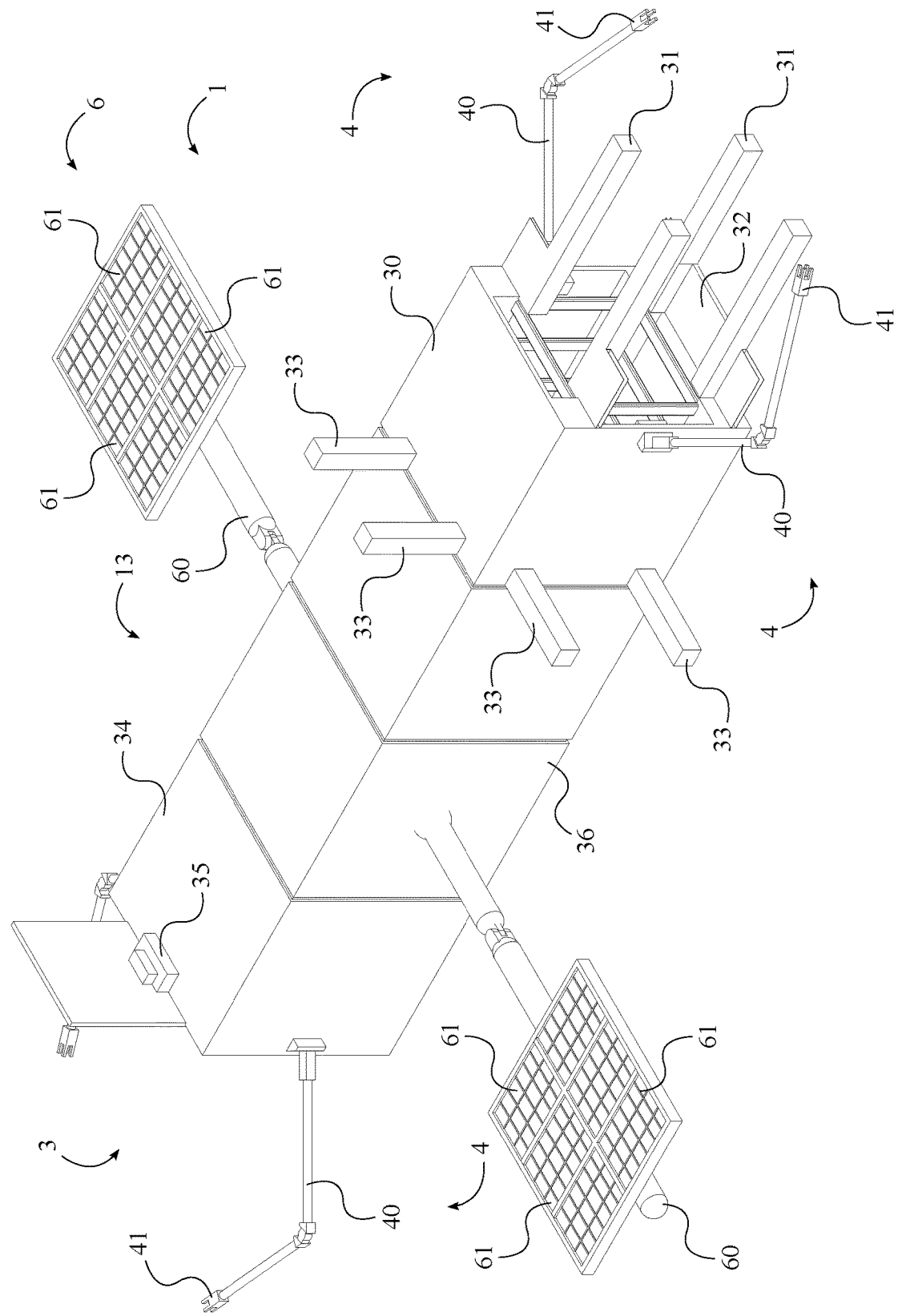
FIG. 8 is a perspective view of the power source being a solar array, wherein a plurality of solar cells is connected along an extension arm.

The power source 6 provides power to the other components of the present invention and, as such, the power source 6 is electrically connected to the plurality of workstations 3, the assembly line conveyor 2, the plurality of robotic assemblers 12, and the plurality of external manipulators 4. The power source 6 can be any mechanism that provides a means for generating electricity, such as a fuel cell or solar array. In embodiments where the power source 6 is a solar array, the power source 6 is adjacently connected to the assembly housing 1 opposite the assembly line conveyor 2, wherein the power source 6 is externally positioned about the assembly housing 1. In reference to FIG. 7, in one solar array embodiment, the power source 6 is integrated into an outer surface 13 of the assembly housing 1, such that the plurality of external manipulators 4 can readily be maneuvered around the power source 6. In reference to FIG. 8, in another solar array embodiment, the power source 6 comprises an extension arm 60 and a plurality of solar cells 61; the extension arm 60 being adjacently connected to the assembly housing 1 and the plurality of solar cells 61 being adjacently connected to the extension arm 60. The plurality of solar cells 61 harnesses the solar energy, while the extension arm 60 allows the plurality of solar cells 61 to be repositioned in order to optimally harness the solar energy.

Figure 10:
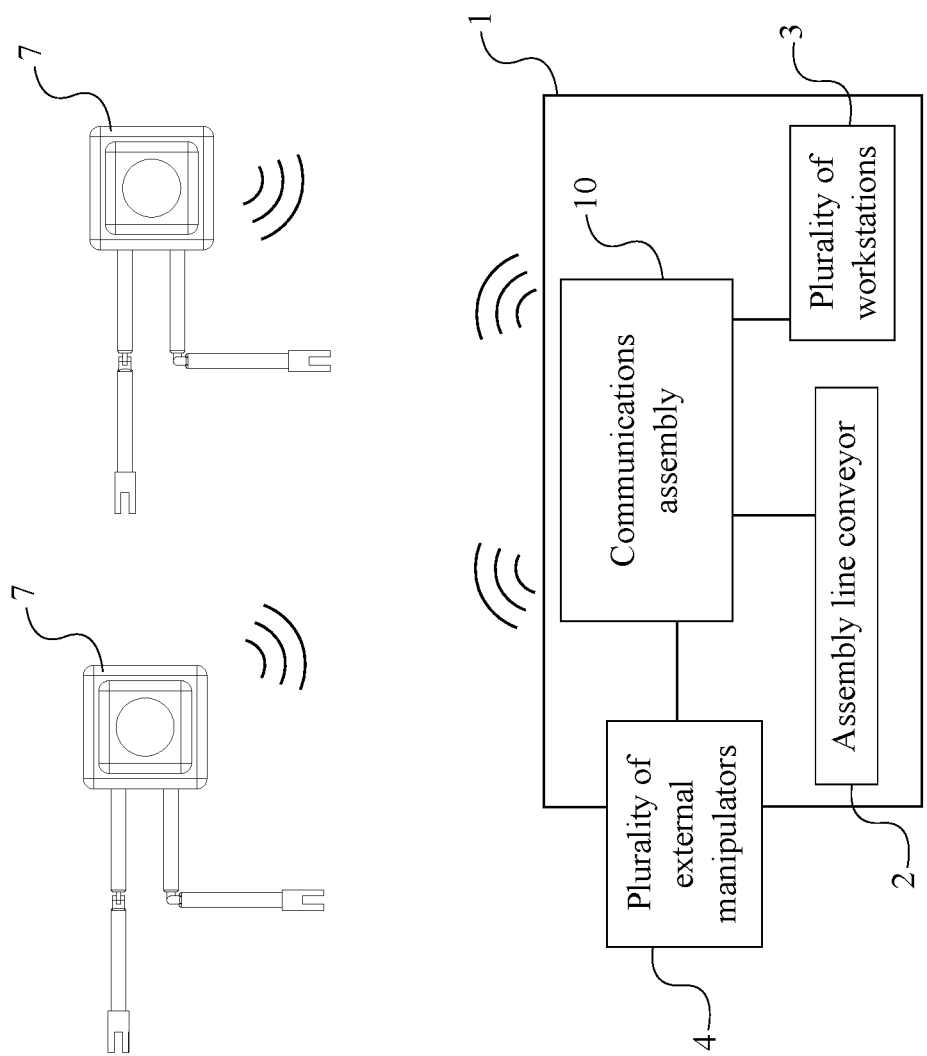
FIG. 10 is a diagram showing the communicable connections between the communications assembly and other components.

In order to communicate the manufacturing instructions with the components of the present invention, the assembly housing 1 comprises a communications assembly 10. The communications assembly 10 includes the electronic equipment that is needed to wirelessly communicate with other sub-systems and the remotely situated base station. The communications assembly 10 receives the manufacturing instructions from the remotely situated base station, analyzes and interprets the manufacturing instructions, and then relays individual instructions to the appropriate sub-systems. As such, the communications assembly 10 is communicably coupled to the plurality of workstations 3, the plurality of external manipulators 4, and the assembly line conveyor 2 through either a wired or wireless connection, as depicted in FIG. 10.

Figure 9:
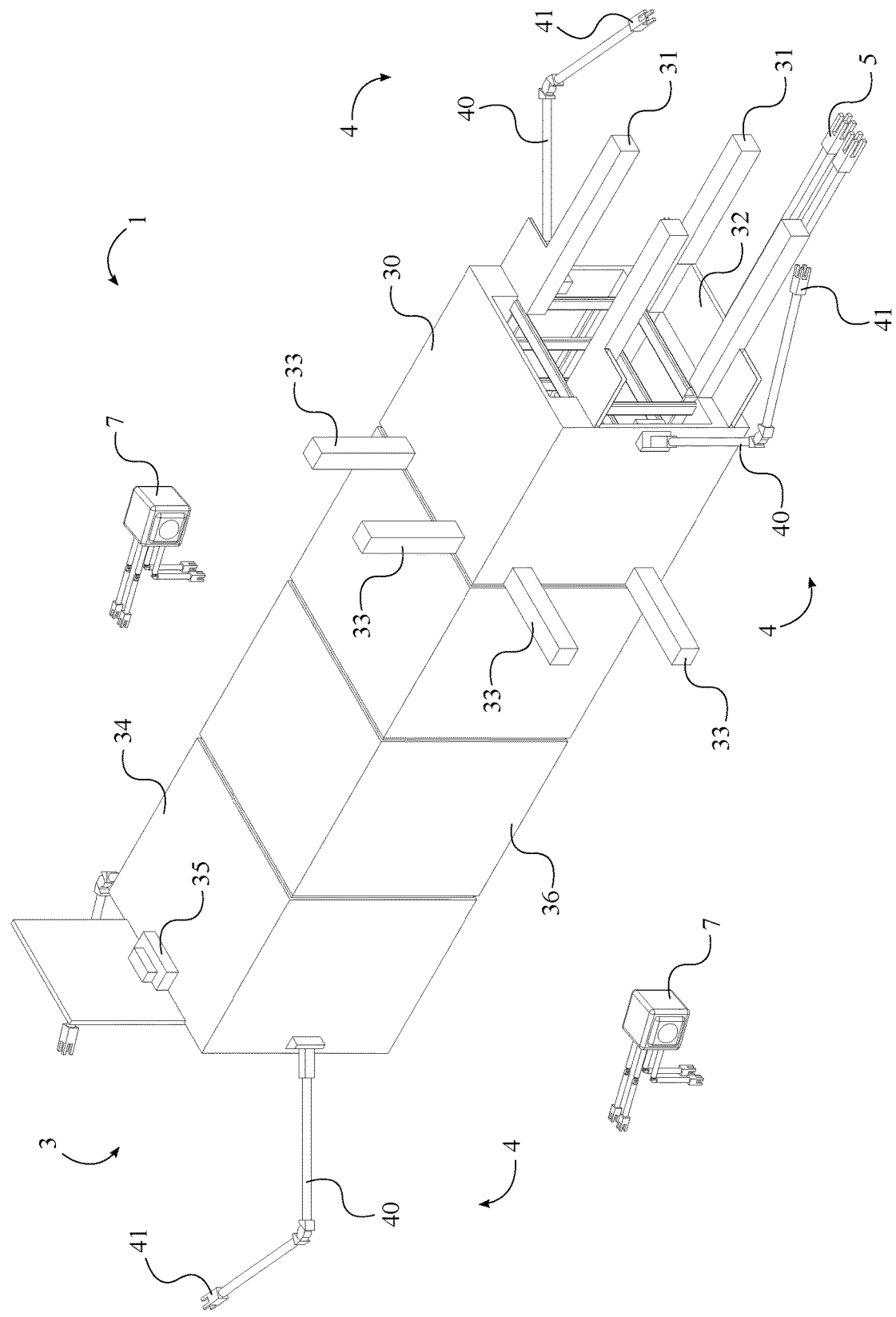
FIG. 9 is a perspective view showing the plurality of segment transport units used to retrieve the segment from the assembly housing.

In reference to FIG. 9, the plurality of segment transport units 7 is used to transport the completed segment from the assembly housing 1 to the orbital construction site. Each of the plurality of segment transport units 7 can be an autonomous or remotely controlled drone or pod, depending on the embodiment of the present invention. The communications assembly 10 is communicably coupled to the plurality of segment transport units 7 through a wireless connection, wherein pre-defined instructions or real-time commands are sent to the plurality of segment transport units 7. Each of the plurality of segment transport units 7 is equipped with a means for grasping the segment, a thrust producing means for propulsion, and a navigation means for accurately transporting the segment. The communications assembly 10 sends instructions to the plurality of segment transport units 7, wherein said instructions direct the plurality of segment transport units 7 in the proper placement of the segment within the orbital construction site.

Although the invention has been explained in relation to its preferred embodiment, it is to be understood that many other possible modifications and variations can be made without departing from the spirit and scope of the invention as hereinafter claimed.

What is claimed is:

1. A gateway segment assembly line comprising:
an assembly housing;
an assembly line conveyor;
a plurality of workstations;
a plurality of external manipulators;
a power source;
a plurality of segment transport units;
a remotely situated base station;
the plurality of workstations comprising a loading station and a castoff station;
the plurality of workstations being sequentially positioned along the assembly housing;
the loading station and the castoff station being positioned opposite each other along the assembly housing;
the assembly line conveyor being positioned within the assembly housing;
the assembly line conveyor being connected to the assembly housing;
the assembly line conveyor being positioned along the plurality of workstations;
the plurality of external manipulators being adjacently connected to the assembly housing opposite the assembly line conveyor;
the power source being adjacently connected to the assembly housing opposite the assembly line conveyor;
the power source comprising an extension arm and a plurality of solar cells;
the extension arm being adjacently connected to the assembly housing;
the plurality of solar cells being adjacently connected to the extension arm;
the assembly housing comprising a communications assembly;
the plurality of segment transport units being communicably coupled to the communications assembly through a wireless connection;
the remotely situated base station being communicably coupled to the communications assembly through a wireless connection;
each of the plurality of segment transport units being a remotely controlled drone;
the loading station comprising a plurality of beam loaders and at least one plate loader;
the plurality of beam loaders and the at least one plate loader being adjacently connected to the assembly housing;
the plurality of beam loaders and the at least one plate loader being externally positioned to the assembly housing;
the plurality of beam loaders and the at least one plate loader being aligned with the assembly line conveyor;
the plurality of beam loaders and the at least one plate loader being repositionable about a perimeter of the loading station;
each of the plurality of external manipulators comprising a maneuverable arm, a first manipulator extremity, and a second manipulator extremity;
the maneuverable arms being adjacently connected to the assembly housing;
the first manipulator extremity being terminally attached to the maneuverable arm opposite the assembly housing;
the second manipulator extremities being adjacently attached to the assembly housing, wherein the second manipulator extremities is interchangeable with the first manipulator extremities.

2. The gateway segment assembly line as claimed in claim 1 comprising:
a spacecraft docking mechanism;
the spacecraft docking mechanism being adjacently connected to the assembly housing; and
the spacecraft docking mechanism being positioned adjacent to the loading station.

3. The gateway segment assembly line as claimed in claim 1 comprising:
the loading station comprising a plurality of support beam loaders;
the plurality of support beam loaders being positioned opposite the plurality of beam loaders and the at least one plate loader; and
the plurality of support beam loaders being positioned in between the plurality of beam loaders and the castoff station.

4. The gateway segment assembly line as claimed in claim 1 comprising:
the assembly line conveyor comprising a plurality of beam guides; and
the plurality of beam guides being aligned with the plurality of beam loaders, wherein the plurality of beam guides is repositionable with the plurality of beam loaders.

5. The gateway segment assembly line as claimed in claim 1 comprising:
the loading station comprising a plurality of support beam loaders;
the plurality of support beam loaders being adjacently connected to the assembly housing; and
the plurality of support beam loaders traversing through the assembly housing.

6. The gateway segment assembly line as claimed in claim 5, wherein each of the plurality of support beam loaders is repositionable about the perimeter of the assembly housing.

7. The gateway segment assembly line as claimed in claim 1 comprising:
   the assembly housing comprising an assembler guide network and a plurality of robotic assemblers;
   the assembler guide network being positioned adjacent to the assembly line conveyor; and
   the plurality of robotic assemblers being slidably connected to the assembler guide network.

8. The gateway segment assembly line as claimed in claim 1 comprising:
   the castoff station comprising a wall loader; and
   the wall loader being adjacently connected to the assembly housing.

9. The gateway segment assembly line as claimed in claim 1 comprising:
   the plurality of workstations comprising at least one specialized fabrication station; and
   the at least one specialized fabrication station being positioned in between the loading station and the castoff station.

10. The gateway segment assembly line as claimed in claim 9 comprising:
    each of the at least one specialized fabrication station comprising at least one material loader;
    each material loader being adjacently connected to the assembly housing; and
    each material loader traversing through the assembly housing.

11. The gateway segment assembly line as claimed in claim 1 comprising:
    the plurality of workstations being linearly positioned along the assembly housing.

12. The gateway segment assembly line as claimed in claim 1 comprising:
    the communications assembly being communicably coupled to the assembly line conveyor, the plurality of external manipulators, and the plurality of workstations.

* * * * *